March 17, 1925.
L. LORENZ
1,530,185
WHIRLING MACHINE FOR PREPARING NEGATIVES
Filed May 17, 1924
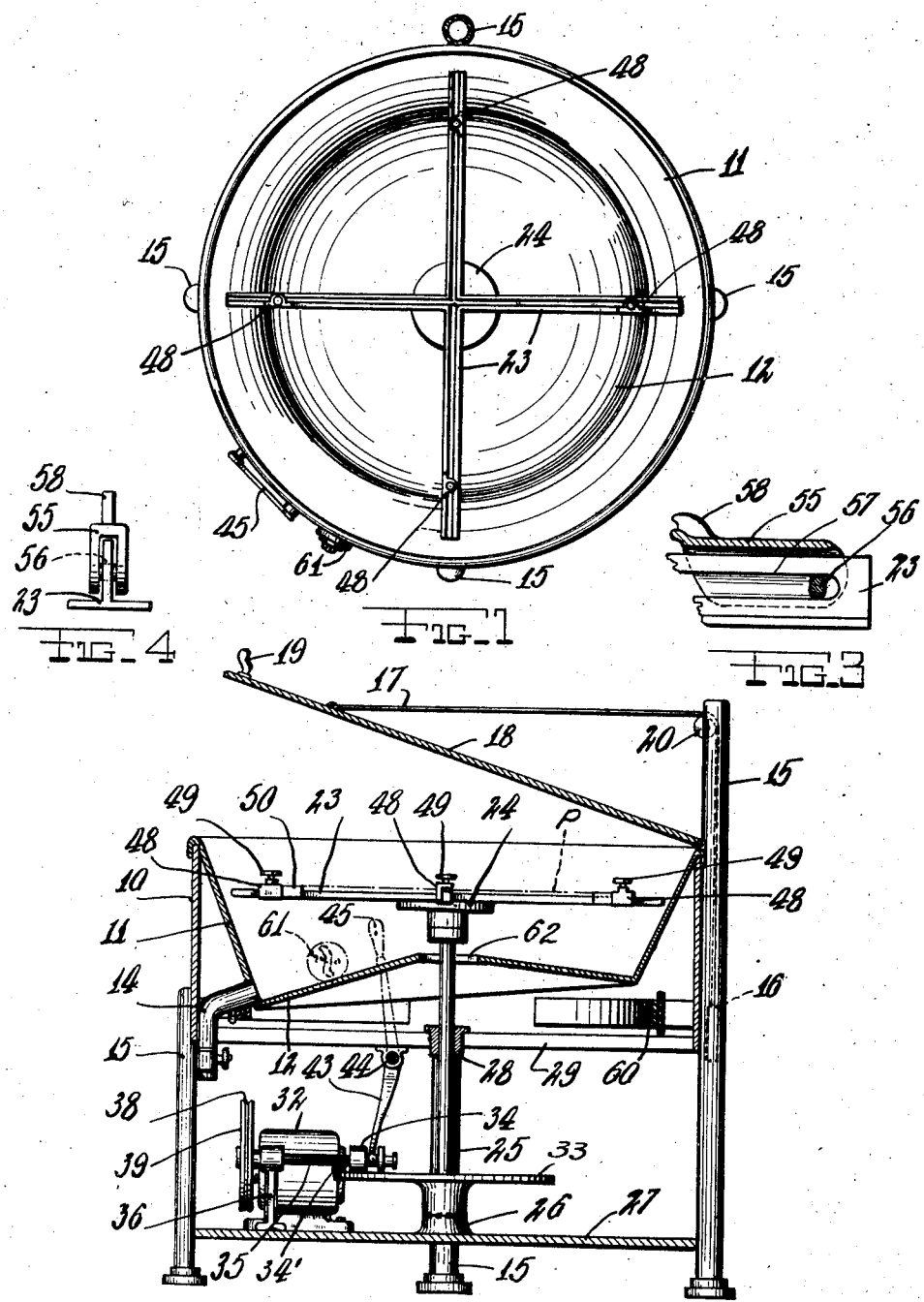
INVENTOR
Louis Lorenz
BY
ATTORNEY Patented Mar. 17, 1925.

1,530,185

UNITED STATES PATENT OFFICE.

LOUIS LORENZ, OF NEW YORK, N. Y.

WHIRLING MACHINE FOR PREPARING NEGATIVES.

Application filed May 17, 1924. Serial No. 713,936.

*To all whom it may concern:*

Be it known that I, LOUIS LORENZ, citizen of the United States, residing at New York city, in the county of New York and State of New York, have invented certain new and useful Improvements in Whirling Machines for Preparing Negatives, of which the following is a specification.

This invention relates to a machine for use in preparing wet plates for photographic work, the machine being intended more particularly for use by professional photographers and engravers. It might also be used for coating plates used in preparing cuts for printing or in like work.

The invention has for an object the provision of a novel and simple machine whereby the emulsion with which the surface of these plates is covered may be more easily applied thereto and more uniformly spread over the surface thereof.

For further comprehension of the invention and of the objects and advantages thereof, reference will be had to the following description and accompanying drawing, and to the appended claims in which the various novel features of the invention are more particularly set forth.

Fig. 1 of the drawing is a vertical sectional view of my improved machine, certain parts being shown in elevation.

Fig. 2 is a plan view thereof, the cover being omitted.

Fig. 3 is a detail sectional view showing the plate gripping element.

Fig. 4 is an end view thereof.

Referring now to the drawing, the machine here comprises a receptacle which consists of an outer cylindrical wall 10 and an inner flaring or frustoconical wall 11 which unites at its upper end with the top of the cylindrical wall and flares downward and inward therefrom. The bottom of the receptacle is formed by a sheet member 12 of shallow conical form which unites at its edges with the bottom of the wall element 11. This bottom member is preferably arranged at a slight incline as shown so as to cause liquid falling thereon to be directed toward one side thereof, a discharge pipe 14 being connected to the lower side of the receptacle to receive and carry away such liquid. The receptacle is supported on the posts 15, one of which is extended upward above the receptacle and has contained in the hollow interior thereof a counterweight 16 which is connected by a cord 17 with a cover 18 hinged to the receptacle adjacent the said post, this cover being provided with a handle 19. The cord 18 passes outwardly from the post 15 around a pulley 20 mounted in a slot in the wall of said post.

Within the receptacle a rotatable member is mounted and is adapted to carry the plate being coated. This member is here in the form of a cross 23 which is supported on a disk 24 fixed to the upper end of a vertical shaft 25 extending upward through the receptacle concentrically thereof, this shaft being supported at its lower end by an anti-friction bearing 26 carried on a platform 27 extending between and fixed to the legs 15 at a distance under the bottom of the receptacle. The shaft 25 may be supported between its ends by a bearing element 28 fixed to the horizontal bracing members 29 which extend between the opposite sides of the outer wall member 10 at the bottom thereof.

The shaft 25 is arranged for rotation at varying speeds, being driven from an electric motor 32 through variable transmission comprising a friction disk 33 fixed to the shaft and engaged by a friction roller 34 feathered as at 34′ on a horizontal shaft 35 which extends across one side of the disk 33. The shaft 35 is supported by a bearing member 36 mounted on the platform 27 and is driven from the motor 32 by means of a belt 38 looped over a pulley 39 on the shaft and also over a smaller pulley on the motor shaft. For shifting the friction roller 34 along the face of the disk 33 an arm 43 is fixed at its upper end to a suitably supported shaft 44 extending horizontally under the receptacle and having fixed thereto an adjustable handle 45, this handle extending upward from the shaft 44 beside the receptacle.

To secure the plate in position on the cross 23 the arms of the latter may have fixed thereto the brackets 48 having laterally projected upper ends through which are threaded set screws 49 adapted to bear on bars 50 resting on one of the latterally extending parts of the base element of the arm, each arm being of inverted T-shape in cross section. I may use instead the type of plate engaging member shown in Figs. 3 and 4 and which comprises a channeled bracket 55 which straddles the central upright element of the arm and which has fixed to the legs thereof, adjacent its outer end, the elliptical pin 56 which passes through a longitudinal slot 57 in the arm, this pin being arranged to have its long axis vertical when the bracket is swung downward to operative position said pin being of a size to bind against the sides of the slot 57 when the arm is so disposed, and thus lock the bracket in place. The bracket may have a finger piece 58 formed on its inner end.

To heat the plate, after application of the emulsion thereto, so as to dry the emulsion, I mount on the wall element 10 of the receptacle a suitable electric heater which is indicated at 60, a switch 61 controlling the current to this heater. The bottom member 12 is formed with a central opening 62 to allow the heated air to pass upward into the receptacle.

In the use of my improved machine the plate to be coated is mounted on the cross element 23, being indicated in position thereon in dotted lines at P in Fig. 1 of the drawing. A few drops of the coating or emulsion are then poured on the plate at the centre thereof and the motor started. The plate being thus caused to revolve slowly the emulsion is gradually distributed by centrifugal force until it is spread evenly over the plate. The cover 18 may then be closed and the current turned on the heater to dry the plate.

Having thus described my invention, what I claim as new and desire to protect by Letters Patent of the United States is as follows:—

1. A device of the type described comprising a receptacle, a rotatable support therein for a plate to be treated, said receptacle having a bottom inclined from side to side thereof, and a discharge pipe connected to the lower side of said bottom, said support comprising a pair of crossed arms, and means adjustable along said arms for engaging the plate and retaining it in position on said support.

2. A device of the type described comprising a receptacle, a rotatable support therein for a plate to be treated, said receptacle having a bottom inclined from side to side thereof, and a discharge pipe connected to the lower side of said bottom, a cover hinged to one side of said receptacle, legs on which said receptacle is mounted, a counterweight for said cover located in one of said legs, and a cord connecting said counterweight with said cover.

3. A device of the type described comprising a receptacle, a rotatable support therein for a plate to be treated, said receptacle having a bottom inclined from side to side thereof, and a discharge pipe connected to the lower side of said bottom, said support comprising a pair of crossed arms, and means adjustable along said arms for engaging the plate and retaining it in position on said support, said means comprising channeled brackets straddling the arms and elliptical pins fixed to and extending between the legs of the respective brackets, said arms being formed with longitudinal slots through which the pins pass and against the walls of which the pins bear when the brackets are in operative position.

4. A device of the type described comprising a receptacle, a rotatable support therein for a plate to be treated, said receptacle having a bottom inclined from side to side thereof, and a discharge pipe connected to the lower side of said bottom, said receptacle having a frusto-conical side wall, and having its bottom of shallow conical form, a heater under said receptacle, the latter having a central opening in its bottom for upward passage of the heated air.

In testimony whereof I have affixed my signature.

LOUIS LORENZ.